United States Patent [19]

Moldenhauer et al.

[11] Patent Number: 5,064,047

[45] Date of Patent: Nov. 12, 1991

[54] ESCALATOR HANDRAIL REENTRY GUARD

[75] Inventors: Detlev B. Moldenhauer, Stadthagen; Willy Adrian, Obernkirchen, both of Fed. Rep. of Germany

[73] Assignee: Otis Elevator Company, Farmington, Conn.

[21] Appl. No.: 668,528

[22] Filed: Mar. 13, 1991

[51] Int. Cl.[5] ............ B65G 17/00

[52] U.S. Cl. ............ 198/338; 198/323

[58] Field of Search ............ 198/323, 337, 338

[56] References Cited

U.S. PATENT DOCUMENTS

| | | | |
|---|---|---|---|
| 2,550,918 | 5/1951 | Felix et al. | 198/338 |
| 2,578,566 | 12/1951 | Masek et al. | 198/338 X |
| 2,708,997 | 5/1955 | Durang et al. | 198/338 |
| 2,846,045 | 8/1958 | Fowler | 198/338 X |
| 2,848,093 | 8/1958 | Van Etten | 198/338 X |
| 3,670,862 | 6/1972 | Kito | 180/338 |
| 3,835,977 | 9/1974 | Hewitt et al. | 198/338 X |
| 3,913,723 | 10/1975 | Johnson | 198/323 |
| 3,934,699 | 1/1976 | Saito et al. | 198/338 X |
| 3,970,187 | 7/1976 | Esaki et al. | 198/338 |
| 4,619,355 | 10/1986 | Adrian et al. | 198/338 X |

FOREIGN PATENT DOCUMENTS

| | | | |
|---|---|---|---|
| 1169629 | 5/1964 | Fed. Rep. of Germany | 198/338 |
| 2054640 | 5/1972 | Fed. Rep. of Germany | 198/338 |

*Primary Examiner*—Robert P. Olszewski
*Assistant Examiner*—James R. Bidwell
*Attorney, Agent, or Firm*—William W. Jones

[57] ABSTRACT

The reentry port where an escalator handrail passes out of view at the exit newel of the escalator is provided with an elastomeric reentry guard in the form of a collar surrounding the handrail. The collar has an elastomeric bumper part which is accessible from the exterior of the assembly, and which is mounted on a holder assembly which is contained inside of the escalator skirt housing. The holder and bumper are mounted for limited lateral movement concurrently with the handrail, and such movement is controlled by rollers mounted on the holder assembly, which rollers contact the sides of the handrail. The result is that lateral movements of the handrail as it moves past the reentry guard cause like lateral movements of the housing assembly and bumper. The handrail thus will not rub on the bumper, thereby providing a safer and longer lasting reentry guard.

5 Claims, 2 Drawing Sheets

ESCALATOR HANDRAIL REENTRY GUARD

DESCRIPTION

1. Technical Field

This invention relates to an escalator handrail reentry port guard which protects against things being caught in the reentry port. More particularly, this invention relates to an improved handrail reentry guard which provides a constant gap between the handrail and the guard irrespective of lateral handrail oscillations.

2. Background Art

Escalators and moving walkways are generally equipped with moving handrails mounted on balustrades which flank the treads of the escalator or walkway. The handrails will move along the top of the balustrades and over curved newels at the entrance and exit of the escalator or walkway. The return path of the handrail is disposed inside of the escalator or walkway skirt housings, out of sight. Thus the handrails will emerge from their return path on the entrance newel, and reenter their return path on the exit newel. There will be provided some sort of safety device at the reentry port for the handrail to prevent objects or fingers from being drawn into the entry port by the moving handrail. U.S. Pat. Nos. 2,708,997 to E.F. Duranz, et al; 2,846,045 to A.S. Fowler; 2,848,093 to P.W. Van Etten; 3,670,862 to K. Kito; 3,835,977 to J.H. Hewitt, et al; and 3,970,187 to S. Esaki, et al. disclose various types of reentry port handrail guards. These guards can take the form of brushes, rubber collars, or the like which will snugly surround the handrail to form the smallest possible gap between the guard and the handrail. When a small gap is maintained, there is minimal likelihood that anything can become wedged between the handrail and the guard in the reentry port.

A problem that arises relative to the prior art moving handrail reentry guards results from the fact that the handrail will not always move along a perfectly straight path of travel as it moves past the reentry guard. Due to guide rail wear, handrail wear, temperature variations, and stress placed on the handrail by passengers, the handrail will shift back and forth on the guide rail as it moves along its path of travel. There are two undesirable consequences of this shifting of the handrail. If one establishes a target handrail/guard gap "g", then the shifting of the handrail can at minimum create a gap on one side thereof of 2g. The enlarged gap is obviously more prone to trapping objects than the target gap. The second undesirable result of the shifting handrail is that it can actually abrade, and be abraded by the guard. This abrasion will result in a wearing of the handrail and guard, thus reducing their useful lives, and, can further enlarge the gap between the two. It is readily apparent that the problem of handrail shifting and the effect it has on equipment life and safety is a serious one which needs to be addressed.

DISCLOSURE OF THE INVENTION

This invention provides a solution to the problems resulting from lateral shifting of the handrail on the guide rail at the reentry housing guard. The guard takes the form of an elastomeric collar assembly which surrounds the handrail at the reentry port, and which is mounted on a bracket fixed to the escalator truss or the like. The collar assembly has a pair of side rollers, one mounted on each side of the handrail, which contact the handrail and establish the fixed gap which is desired between the guard and the handrail. The guard is allowed to move laterally with respect to the fixed bracket so that lateral shifting of the handrail causes an equivalent lateral shifting of the guard due to contact between the rollers and the handrail. The handrail is thus prevented from contacting and abrading the guard, and the ideal gap is maintained on both sides of the handrail at the reentry port guard.

It is therefore an object of this invention to provide a moving handrail reentry guard for establishing and maintaining a relatively fixed gap between the guard and the moving handrail for enhanced safety.

It is a further object of this invention to provide a reentry guard of the character described which avoids contact between the guard and handrail for increasing operational and service life.

It is an additional object of this invention to provide a reentry guard of the character described which is flexible and wherein the gap and freedom from contact are maintained despite lateral shifting of the handrail which occurs during operation.

These and other objects and advantages of this invention will become more readily apparent from the following detailed description of a preferred embodiment thereof when taken in conjunction with the accompanying drawings, in which:

BEST MODE FOR CARRYING OUT THE INVENTION

Figure 1:
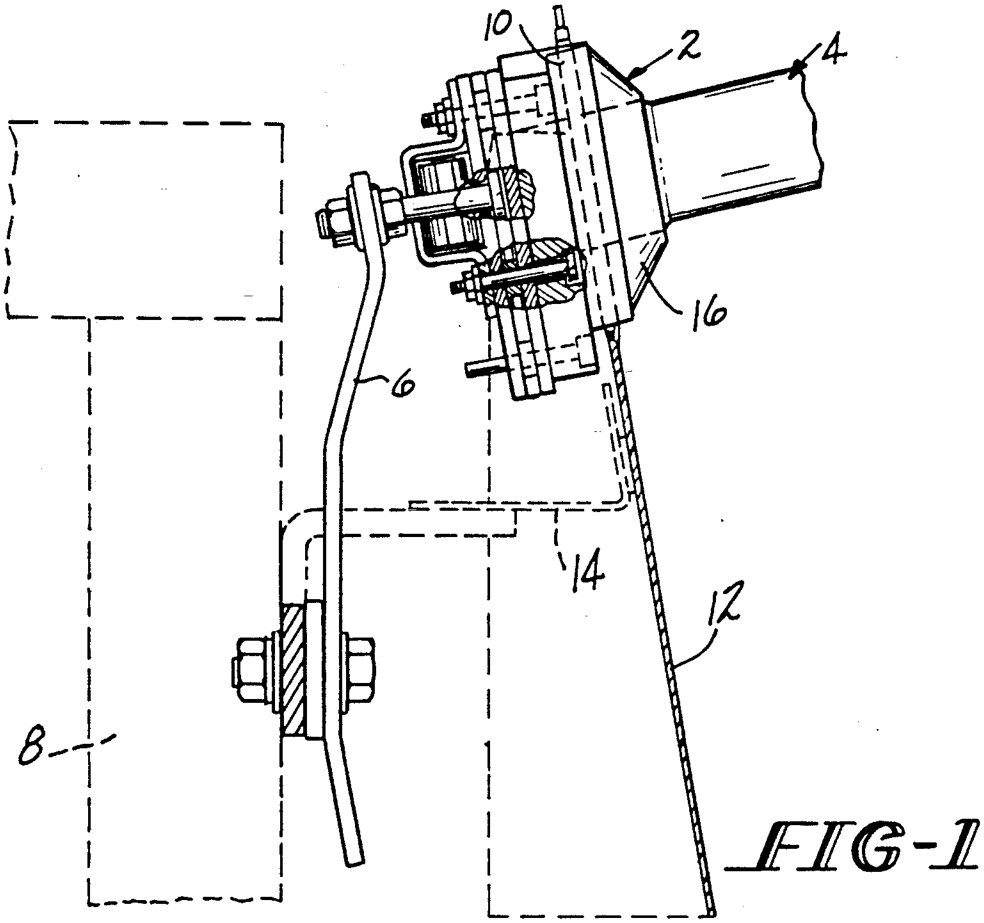
FIG. 1 is a fragmented side elevational view of the handrail guard and its mount assembly showing how it is affixed to an escalator or moving walkway frame or truss.

Referring now to FIG. 1, the handrail reentry guard assembly is denoted generally by the numeral 2 and the handrail is denoted generally by the numeral 4. The guard assembly 2 is mounted on a bracket 6 which is bolted to the escalator or the like truss or frame 8 (shown in phantom). The guard 2 is disposed in an opening 10 in an end wall 12 of the escalator skirt, i.e., the parts of the escalator which flank the steps and frame the entrance and exit of the escalator. It will be appreciated that the handrail 4 passes through the guard 2 and thus the skirt wall 12 at the balustrade newels. The skirt wall 12 is fixed to the truss 8 by a bracket 1 4 (shown in phantom).

Figure 2:
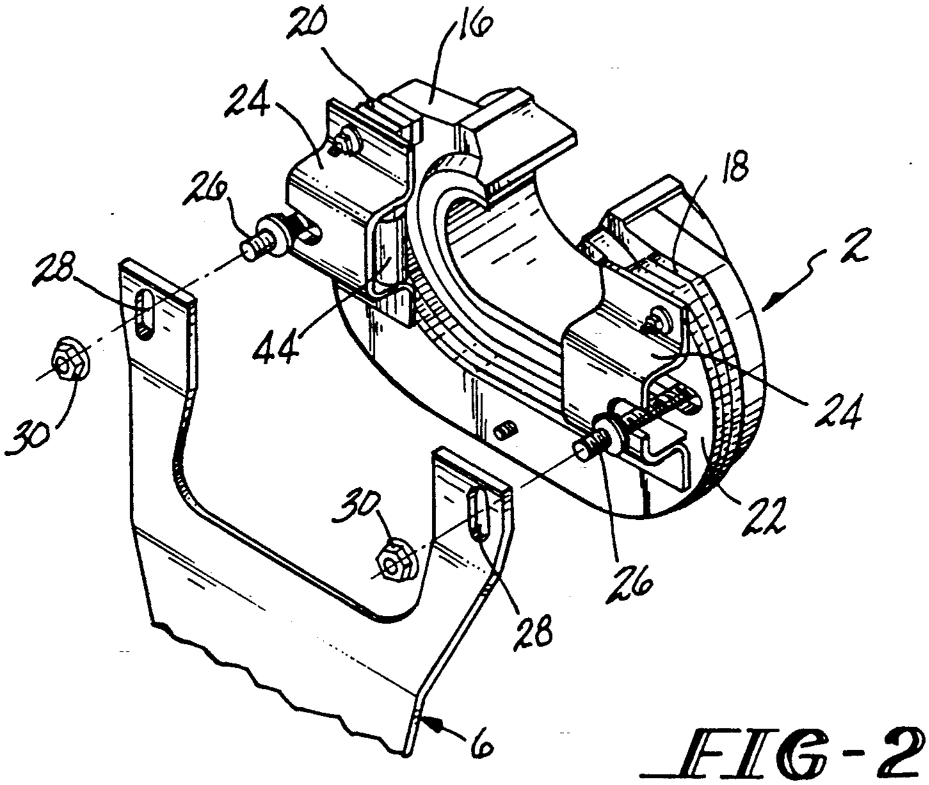
FIG. 2 is a fragmented perspective view of the guard assembly and its mount bracket.
Figure 3:
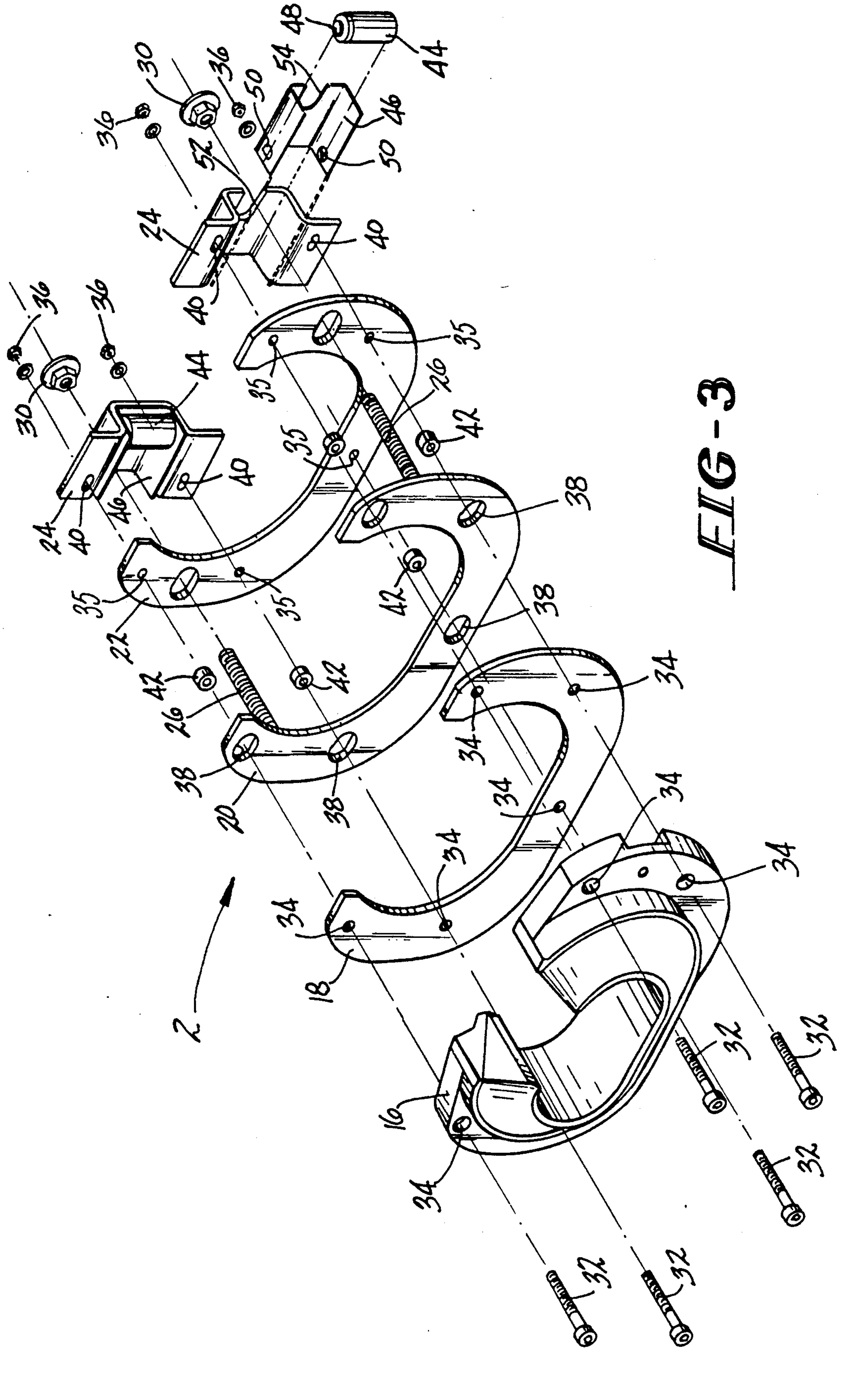
FIG. 3 is an exploded perspective view of the handrail reentry guard assembly showing its several component parts.

Referring to FIGS. 2 and 3, the guard assembly 2 includes an elastomeric bumper 16, a backing plate 18, a bracket plate 20, a roller mount plate 22, and roller mounts 24. The bumper 16 projects through the skirt wall opening 10 and is the only part of the guard assembly accessible from the exterior of the skirt wall 12. The remainder of the guard assembly 2 is disposed behind the skirt wall 12 and is not accessible to the general public. The bracket plate 20 has a pair of bolts 26 which are fastened to the bracket 6 through openings 28 with nuts 30. The openings 28 are vertically elongated but laterally restricted so that the plate 20 can be adjusted vertically relative to the bracket 6, but not horizontally. The plate 20 thus serves as an extension of the bracket 6. The bumper 16, backing plate 18, bracket plate 20 with spacers (bushings) 42 and roller mount plate 22 with threaded holes 35 are fastened together (tightened down) by bolts 32 which pass through aligned openings 34 in the bumper 16 and plate 18 and also through holes of bushings 42 which are in holes 38 of plate 20. Then the roller mounts 24 (complete) will be fingertightened onto the roller mount plate 22 by means of nuts 36. The bolts 32 also pass through laterally elongated openings 38 in the bracket plate 20, and laterally elongated openings 40 in the roller mounts 24. The openings 40 allow the roller mounts to be laterally moved into engagement with the sides of the handrail before the nuts 36 are tightened in place. Bushings 42 are mounted on the bolts 32 so as to be positioned in the laterally elongated openings 38 in the bracket plate 20. The bushings 42 prevent the plates 18 and 22 from being clamped onto the bracket plate 20. The bumper 16, plates 18, 22 and roller mounts 24 are thus free to slide back and forth laterally with respect to the bracket plate 20 and the bracket 6.

The rollers 44 are snapped into sleeves 46 via hubs 48 and sockets 50, and the sleeves 46 are then secured within the roller mounts 24. The roller mounts 24 and sleeves 46 are provided with aligned recesses 52 and 54, respectively, through which the bolts 26 pass. The bolts 26 thus will not interfere with the lateral shifting of the rollers 44 and roller mounts 24 and the bumper 16 and plates 18 and 22.

When the assembly 2 is initially installed, it can be properly positioned in engagement with the sides of the handrail 4. (All units 16, 18, 20, 22 centrally to the handrail 4). The nuts 30 will then be tightened to secure the assembly 2 to the bracket 6. Now the roller mounts 24 (with rollers 44 and sleeves 46) can be properly positioned in engagement with the sides of the handrail 4 whereby the initial gap size will be set. The nuts 36 will then be tightened down. This will fix and keep the bumper 16 in the set gap position between itself and the handrail 4.

It will be readily appreciated that the bumper 16, plates 18 and 22, and roller mounts 24 will be free to shift horizontally in response to lateral shifting of the handrail 4 which is detected by the rollers 44. The preset gap will thus be maintained, and the handrail will be prevented from abrading the bumper. The guard assembly of this invention can be installed on original equipment, and can also be retrofitted onto existing equipment in service. The result in either case will be a controlled handrail/bumper gap and longer service life for the handrail and for the guard assembly.

Since many changes and variations of the disclosed embodiment of the invention may be made without departing from the inventive concept, it is not intended to limit the invention otherwise than as required by the appended claims.

What is claimed is:

1. In combination with a people mover, a moving handrail reentry guard assembly comprising:

a) a bracket fixed to a truss on the people mover;

b) an elastomeric bumper disposed about the handrail at the reentry, said bumper being spaced from the handrail a predetermined distance to define a relatively constant gap between the handrail and the bumper;

c) roller means straddling the handrail for rolling engagement with opposite sides of the handrail; and d) mounting means connecting the bumper and roller means to the bracket, said mounting means allowing lateral motion of the bumper relative to the bracket in response to shifting of the handrail sensed by the roller means whereby the gap is maintained and the handrail is prevented from abrading the bumper.

2. The assembly of claim 1 wherein said mounting means comprises a support plate fixed to said bracket; reinforcing plates sandwiched about said support plate and fixed to said bumper by a plurality of bolts, said bolts passing through laterally elongated openings in said support plate to allow lateral movement of said bumper and reinforcing plates relative to said support plate.

3. The assembly of claim 2 wherein said roller means is mounted on one of said reinforcing plates.

4. The assembly of claim 2 wherein said support plate is mounted on said bracket by a second plurality of bolts, said second plurality of bolts passing through a plurality of laterally elongated openings in one of said reinforcing plates.

5. The assembly of claim 4 wherein said roller means are journaled on said one of said reinforcing plates.

* * * * *